United States Patent
Ciochina et al.

(10) Patent No.: US 12,167,442 B2
(45) Date of Patent: Dec. 10, 2024

(54) COMMUNICATION DEVICES AND METHODS

(71) Applicant: Sony Group Corporation, Tokyo (JP)

(72) Inventors: Dana Ciochina, Stuttgart (DE); Thomas Handte, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 578 days.

(21) Appl. No.: 17/432,506

(22) PCT Filed: Feb. 26, 2020

(86) PCT No.: PCT/EP2020/055053
§ 371 (c)(1),
(2) Date: Aug. 20, 2021

(87) PCT Pub. No.: WO2020/174015
PCT Pub. Date: Sep. 3, 2020

(65) Prior Publication Data
US 2022/0174725 A1     Jun. 2, 2022

(30) Foreign Application Priority Data
Feb. 27, 2019  (EP) .................... 19159647

(51) Int. Cl.
*H04W 74/00*  (2009.01)
*H04W 72/0446*  (2023.01)
(Continued)

(52) U.S. Cl.
CPC ..... *H04W 74/002* (2013.01); *H04W 72/0446* (2013.01); *H04W 72/12* (2013.01); *H04W 74/0816* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2011/0222493 A1 | 9/2011 | Mangold et al. | |
| 2014/0079016 A1* | 3/2014 | Dai | H04L 5/0041 370/329 |

(Continued)

FOREIGN PATENT DOCUMENTS

| | | |
|---|---|---|
| CN | 102067652 A | 5/2011 |
| CN | 104094665 A | 10/2014 |

(Continued)

OTHER PUBLICATIONS

International Search Report and Written Opinion mailed on Apr. 24, 2020, received for PCT Application PCT/EP2020/055053, Filed on Feb. 26, 2020, 13 pages.

(Continued)

*Primary Examiner* — Kouroush Mohebbi
(74) *Attorney, Agent, or Firm* — XSENSUS LLP

(57) ABSTRACT

A first communication device comprises circuitry configured to exchange control information with one or more second communication devices on a primary communication channel, exchange data with one or more second communication devices on one or more secondary communication channels and/or the primary communication channel, receive an access request to access the primary communication channel and/or one or more secondary communication channels by a second communication device on an access channel that is a different channel than the primary communication channel, the access request indicating one or more parameters of the desired communication, and transmit an access response on the access channel, the access response including time information indicating information regarding the time of desired communication and channel information indicating parameters of the communication channels of the desired communication.

20 Claims, 10 Drawing Sheets

(51) Int. Cl.
    *H04W 72/12*     (2023.01)
    *H04W 74/0816*     (2024.01)
    *H04W 84/12*     (2009.01)

(56) References Cited

U.S. PATENT DOCUMENTS

| | | |
|---|---|---|
| 2016/0088657 A1 | 3/2016 | Djukic et al. |
| 2016/0309505 A1 | 10/2016 | Kim |
| 2017/0257888 A1 | 9/2017 | Kneckt |
| 2018/0092127 A1 | 3/2018 | Park |

FOREIGN PATENT DOCUMENTS

| | | | |
|---|---|---|---|
| CN | 104272848 A | 1/2015 | |
| CN | 105493583 A | 4/2016 | |
| CN | 105682247 A | 6/2016 | |
| CN | 106470090 A | 3/2017 | |
| WO | WO-2016210389 A1 | 12/2016 | |
| WO | WO-2018204604 A1 * | 11/2018 | ........... H04B 17/318 |

OTHER PUBLICATIONS

IEEE, "Part 11: Wireless LAN Medium Access Control (MAC) and Physical Layer (PHY) Specifications", IEEE Standard Association, IEEE Computer Society, IEEE Std 802.11™-2012, Mar. 29, 2012, pp. 1-2695.

IEEE, "Part 11: Wireless LAN Medium Access Control (MAC) and Physical Layer (PHY) Specifications", IEEE Standard Association, IEEE Computer Society, IEEE Std 802.11™-2016, pp. 1-3532.

Chen et al., "Enhanced LAA for Unlicensed LTE Deployment Based on TXOP Contention", IEEE Transactions on Communications, vol. 67, No. 1, Jan. 2019, pp. 417-429.

* cited by examiner

COMMUNICATION DEVICES AND METHODS

CROSS-REFERENCE TO RELATED APPLICATIONS

The present application is based on PCT filing PCT/EP2020/055053, filed Feb. 26, 2020, which claims the priority of European patent application no. EP 19159647.7, filed Feb. 27, 2019, the contents of each are hereby incorporated by reference.

BACKGROUND

Field of the Disclosure

The present disclosure relates to first and second communication devices and method, in particular for use in wireless communication.

Description of Related Art

In unlicensed bands, communication devices are required to share bandwidth with each other. For that reason, regulatory bodies often impose listen-before-talk (LBT) that enforces communication devices to listen to or sense the wireless medium before transmitting any data. If the medium is sensed as busy, a communication device defers its transmission to a later point in time. The rationale behind this is to avoid collisions, i.e. transmissions by two or more communication devices at the same time. Unfortunately, this concept is not sufficient to provide a collision-free communication. The main reason is that in a spatially distributed system some communication devices may not hear other communication devices which are, however, part of the current data exchange. This is often referred to as the hidden-node problem. Communication mechanisms such as beamforming may augment the number of hidden nodes since directional data transmission focuses transmit power in narrow spatial directions. Another reason is that communication devices operating in unlicensed bands may use different principles to establish communication between nodes.

For these reasons, congestion of the wireless medium is a limiting factor in achieving low-latency communication. In addition, in a congested environment, the overhead for collision resolution becomes high which lowers the data throughput.

Furthermore, within a multi-channel operation, the channels over which a first communication device, e.g. an access point (AP), can operate are categorized into one primary communication channel and one or more secondary communication channels. Most of the control information (e.g. beacons, channel access, etc.) is transmitted over the primary communication channel, such that legacy devices capable of operating only over one channel are able to get fair access to the medium. Also, due to legacy operation, the primary communication channel is included in all transmissions i.e., a second communication device, e.g. a station (STA), is not able to only operate over secondary communication channels. The reason for this is that the channel access timings in the basic service set (BSS) are based on the clear channel assessment (CCA) activity on the primary communication channel.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly nor impliedly admitted as prior art against the present disclosure.

SUMMARY

It is an object to provide communication devices and method that are configured to reduce a likelihood of collisions and a latency of channel access.

According to a first aspect there is provided a first communication device comprising circuitry configured to
exchange control information with one or more second communication devices on a primary communication channel,
exchange data with one or more second communication devices on one or more secondary communication channels and/or the primary communication channel,
receive an access request to access the primary communication channel and/or one or more secondary communication channels by a second communication device on an access channel that is a different channel than the primary communication channel, the access request indicating one or more parameters of the desired communication, and
transmit an access response on the access channel, the access response including time information indicating information regarding the time of desired communication and channel information indicating parameters of the communication channels of the desired communication.

According to a further aspect there is provided a second communication device comprising circuitry configured to
exchange control information with a first communication device on a primary communication channel,
exchange data with the first communication device on one or more secondary communication channels and/or the primary communication channel,
transmit an access request to access the primary communication channel and/or one or more secondary communication channels by a second communication device on an access channel that is a different channel than the primary communication channel, the access request indicating one or more parameters of the desired communication,
receive an access response, the access response including time information indicating information regarding the time of desired communication and channel information indicating parameters of the communication channels of the desired communication, and
schedule the communication with the first communication device according to the received access response.

According to a further aspect there is provided a first communication method comprising
exchanging control information with one or more second communication devices on a primary communication channel,
exchanging data with one or more second communication devices on one or more secondary communication channels and/or the primary communication channel,
receiving an access request to access the primary communication channel and/or one or more secondary communication channels by a second communication device on an access channel that is a different channel than the primary communication channel, the access request indicating one or more parameters of the desired communication, and transmitting an access response on the access channel, the access response including time information indicating information regarding the time of desired communication and channel information indicating parameters of the communication channels of the desired communication.

According to a further aspect there is provided a second communication method comprising exchanging control information with a first communication device on a primary communication channel, exchanging data with the first communication device on one or more secondary communication channels and/or the primary communication channel, transmitting an access request to access the primary communication channel and/or one or more secondary communication channels by a second communication device on an access channel that is a different channel than the primary communication channel, the access request indicating one or more parameters of the desired communication, receiving an access response, the access response including time information indicating information regarding the time of desired communication and channel information indicating parameters of the communication channels of the desired communication, and scheduling the communication with the first communication device according to the received access response.

According to still further aspects a computer program comprising program means for causing a computer to carry out the steps of the method disclosed herein, when said computer program is carried out on a computer, as well as a non-transitory computer-readable recording medium that stores therein a computer program product, which, when executed by a processor, causes the method disclosed herein to be performed are provided.

Embodiments are defined in the dependent claims. It shall be understood that the disclosed communication methods, the disclosed computer program and the disclosed computer-readable recording medium have similar and/or identical further embodiments as the claimed communication device and as defined in the dependent claims and/or disclosed herein.

One of the aspects of the disclosure is to introduce the use of part of an unlicensed channel or a complete unlicensed channel as an additional channel (referred to as access channel or as unlicensed special access channel (USAC) herein). The use of this access channel may be chosen, announced and limited for specific requests and traffic types of the second communication device associated to the access channel. Among these specific requests and traffic types may be channel access requests, collision notifications, schedule messages, short high priority data sessions, and fast session transfer (FST) initializations. The first communication device may listen to this access channel even when active transmissions on the other channels, including the primary communication channel, exist. New second communication devices (e.g. new STAs (nSTA)), i.e. second communication devices supporting the access channel and its use, within the BSS environment may primarily send their channel access requests through this access channel.

For getting access to the primary communication channel (also called primary channel herein) and/or one or more secondary communication channels (also called secondary channels herein), a (new) second communication device may first perform physical and virtual carrier sense on the access channel and the primary communication channel. If the access channel is idle, the second communication device sends an access request with required parameters of a future transmission (e.g. duration and/or priority and/or operating channels). The first communication device replies with an access response, indicating the time when a transmission can occur and with which parameters (e.g. which channels may be accessed, which channel access policy should be used, on which channels a trigger frame will be sent to trigger the transmission of the second communication device, etc.).

In this context it shall be noted that an AP shall generally be understood as an entity that provides PHY and MAC interface to the wireless medium and that provides access to distribution services via the wireless medium for associated STAs. An STA shall generally be understood is an entity that provides PHY and MAC interface to the wireless medium. It may associate to an AP to get access to distribution services.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWING

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
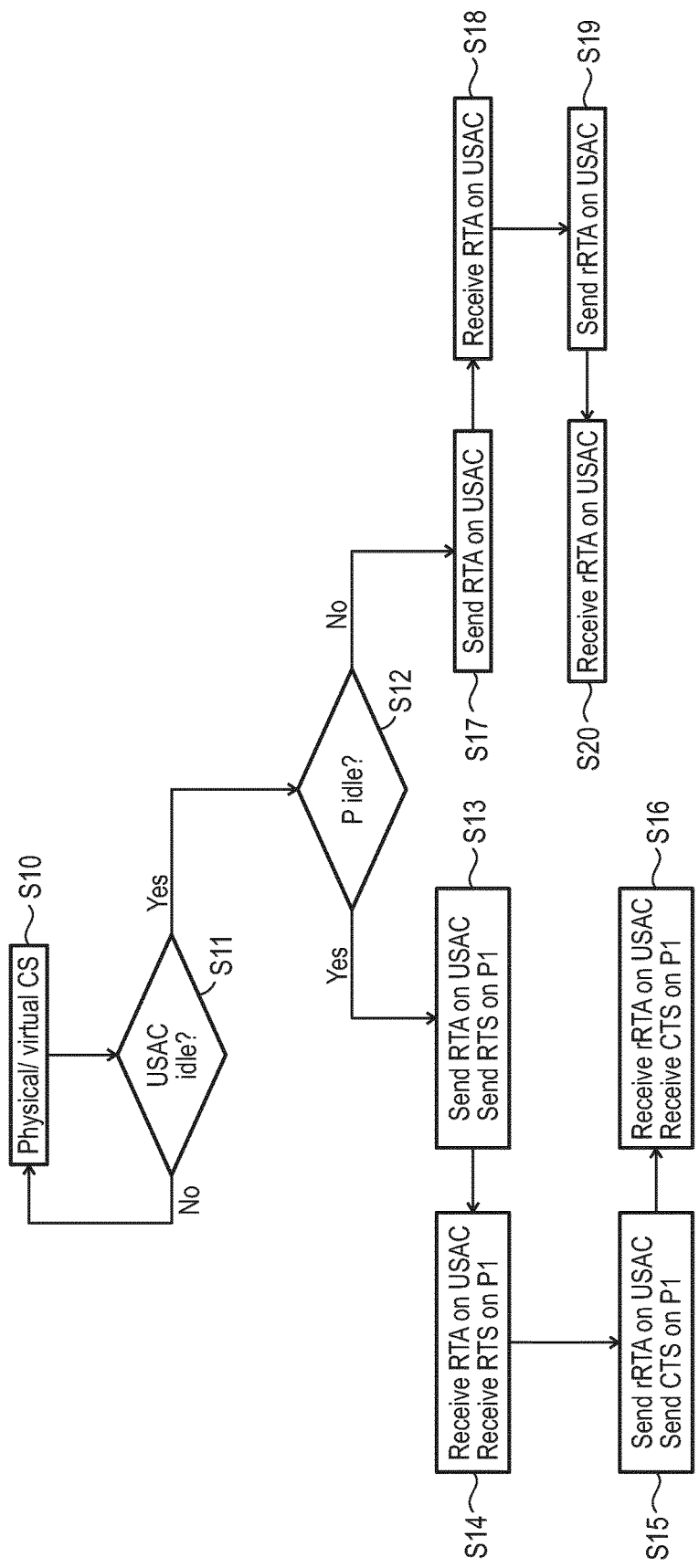
FIG. 1 shows a flowchart of an embodiment of a communication method according to the present disclosure.

A common channel access mechanism in unlicensed bands is CSMA/CS (carrier sense multiple access/collision avoidance), in which the STAs first listen to the channel for a predefined amount of time and based on energy and/or preamble detection of the PHY headers decide if the medium is busy or idle. If the medium is considered idle, the STAs may start transmitting. If the medium is busy, each STA that needs access to the medium chooses a random backoff counter, i.e., a number of time slots that they will defer transmission and only reattempt transmission when this backoff counter reaches 0. The backoff counter is started when the medium is idle. The reason for this random backoff procedure is to avoid collisions. Assuming multiple STAs that intend to access the channel have the same fixed backoff time, they all attempt transmission at the same time, resulting in a collision.

Performing only energy and/or preamble detection to determine if the medium is busy or idle is, however, prone to a hidden node problem, i.e., it may happen that some STAs are not able to hear the transmission of other STAs in the BSS and mistakenly consider the medium idle and start transmitting. This leads to unwanted collisions.

To avoid this problem, within the IEEE802.11 standards, virtual carrier sensing has been introduced, which is a MAC level mechanism to detect if the medium is busy. The idea behind this mechanism is to introduce within the MAC frame header an indication of the duration of the frame or transmit opportunity (TXOP). In order to increase the probability that the other STAs are correctly detecting the MAC header, before the actual TxOP establishment, a CTS (clear to send) frame or an RTS (request to send)—CTS exchange can be transmitted. However, collisions can still happen when STAs attempting transmission towards an AP are not hearing each other for example.

Within a multi-channel operation, the channels over which an AP can operate are categorized into one primary communication channel and one or more secondary communication channels. Most of the control information e.g., beacons, channel access, etc., is transmitted over the primary communication channel such that legacy devices capable of operating only over one channel are able to associate, obtain control messages and get fair access to the medium. Also, due to legacy operation, the primary communication channel is included in all transmissions i.e., a STA is not able to only cover secondary communication channels. The reason for this is that the channel access timings in the BSS are based on the CCA activity on the primary communication channel. Furthermore, STAs only have to listen to the primary channels to receive NAV information, whereas on the secondary channels it is enough to only perform energy detection. However, this can also be inefficient, as described in the following example.

Assuming a case in which an AP can operate over one channel chosen as primary (P) and two secondary communication channels, further referred to as S1 and S2. Assuming a STA, which is only capable of operating over two channels, is already having an active transmission in bonded or aggregation mode over P and S1. Even though the secondary communication channel S2 is free another STA cannot be served on this, because the primary communication channel is occupied for the same time as the transmission of the STA1. Therefore, the only chance is to wait for the TXOP of the first STA to end, then contend for the medium. After the backoff time expires, the STA may attempt to access the channel.

The present disclosure aims at improving on one or both problems presented above: to minimize collisions due to hidden nodes and to minimize latency of channel access by providing a means to access when the primary communication channel is busy.

In an embodiment an AP (or, more generally, a first communication device) chooses, announces and limits use of one or part of an unlicensed channel only for specific requests and traffic types for the STAs (or, more generally, a second communication device) associated to itself. Among these are channel access requests, collision notifications, schedule messages, short high priority data sessions, fast session transfer (FST) initializations. This channel is further referred to as unlicensed special access channel (USAC), also called "access channel" herein. The AP listens to this channel, even when active transmissions on the other channels, including the primary communication channel exist. New STAs (nSTA), i.e. STAs supporting USAC, within the BSS environment will primarily send their channel access request through this channel.

An embodiment of the disclosed method is depicted in FIG. 1 and comprises the following steps. An nSTA requiring access, first performs (step S10) physical and virtual carrier sense (CS) on the USAC and primary communication channel. If the USAC is not idle, which is checked in step S11, the method continues with step S10. If the USAC is idle, it is checked in step S12 if the primary communication channel P is idle.

If the primary communication channel P is idle the nSTA sends (step S13) a request to access (RTA) frame (also called access request) indicating required parameters of a future transmission (e.g., duration, priority, operating channels, etc.) via the USAC and a Request to Send (RTS) via the primary communication channel P. The AP receives the RTA (step S14) via the USAC and the RTS via the primary communication channel P and replies (step S15) with an rRTA (RTA response, also called access response) via the USAC and a CTS via the primary communication channel P, if the channels are also idle at the AP. The rRTA indicates the time stamp when a trigger or a poll from the AP will be sent to trigger desired transmission from the requesting nSTA or when the requesting nSTA may reattempt channel access and with which parameters (e.g., which channels may be accessed, which channel access policy should be used, on which channels a trigger frame will be sent by the AP to trigger the transmission of the nSTA, etc.). The rRTA is received by the nSTA in step S16.

If the check in step S12 reveals that the primary communication channel P is not idle, the same actions as in steps S13 to S16 are performed in steps S17 to S20, but only via the USAC sensed as idle and not via the primary communication channel P in parallel.

The information provided by the rRTA may then be used by the nSTA to schedule the communication with the first communication device. The nSTA does generally not automatically start transmitting data at a prescribed/inferred time in the future as it is still an uncontrolled environment, but will first attempt channel access in the desired communication channel, based on the parameters sent within the rRTA. For example, it will still perform LBT, i.e., preferably physical CS only, and refrain from transmitting if the desired communication channel is busy.

Several aspects might in some embodiments be considered when requesting access over a channel different than the primary communication channel:

protecting of the legacy devices, which only listen to the network allocation vector (NAV) on the primary communication channel;

protecting the TXOPs in secondary communication channels only;

defining operation depending on the state of the primary communication channel at the time of the RTA request (whether it is busy or idle);

granting TXOPs according to the occupancy of the secondary communication channels;

defining a procedure when multiple nSTAs request access over the USAC, while primary communication channel is busy.

The proposed schemes provide one or more of the following advantages:

i) If the primary communication channel is busy, the STAs can still signal need for access. The AP can reply with a response containing either timing information e.g., network allocation vector (NAV) information for the channels in which it is operating to let the STA know when to access next, or prepare TXOP in case some of the channel is free.

ii) Collisions from STAs suffering from hidden node problem are mostly eliminated during the data transfers and reduced on the USACs. It is not possible to guarantee on the USAC that two STAs would not send access requests at the same time. However, due to shorter messaging in these channels, the probability of a successful reception (by peer STA) is increased. Furthermore, due to lower collision probability, contention windows can be defined to have smaller sizes, thus reducing wait time in case of a collision.

iii) For ultra-low latency traffic, fast channel access can be granted on the USAC, while data sessions and FST is prepared for transferring the data sessions to channels other than USAC.

Assuming a multi-AP environment in which a certain degree of coordination and information exchange exists, various APs within a coordination cluster can decide upon USAC or be instructed by a master coordinating AP on the appropriate USAC to use i.e., various APs decide, or are informed by a master coordinating AP, which is aware of channel status at the various APs and the potential USAC candidates, if it is possible to assign a common USAC and which access policy should be used for this. Further, if the common use of an USAC among different two APs is not possible, various APs can at least decide or be instructed by the master coordinating AP on a set of measures to reduce collision probabilities and/or occupancy on their respective USACs (e.g., limit collision probabilities of STAs served by AP1 on the USAC of AP2). Since the USAC is in the unlicensed bands, STAs outside of the BSS of the AP or AP coordination cluster can access or occupy the channel. Therefore, one or more of the common contention rules such as carrier sensing and NAV shall be respected by the STAs accessing the USAC and within the BSS or coordinated BSS.

Several embodiments on how to make use of the USAC will be explained in the following.

Figure 2:
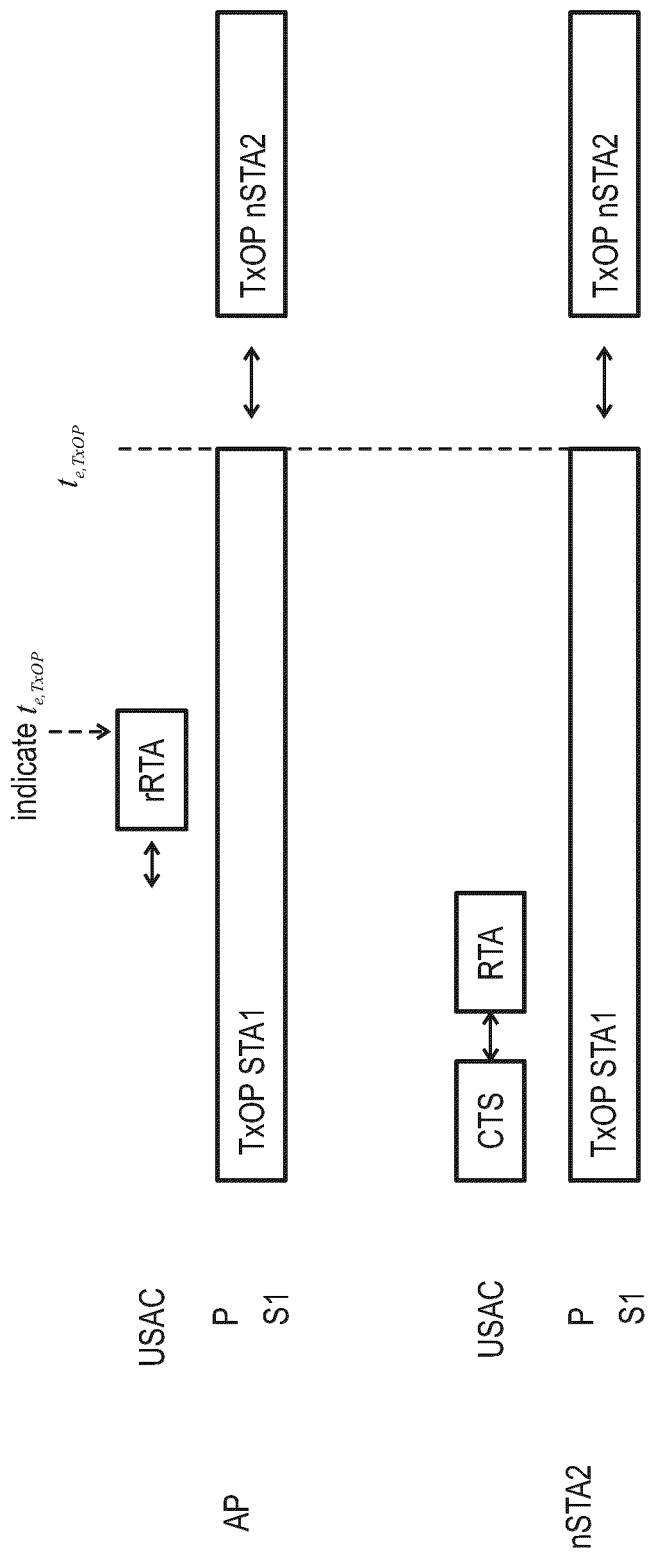
FIG. 2 shows a schematic diagram of a first embodiment of the communication according to the present disclosure.

An embodiment deals with channel access when primary and secondary communication channels are busy. This embodiment of the communication according to the present disclosure is schematically illustrated in FIG. 2. Access is made via the USAC and access to the medium is given after the end on the existing TxOP. The IFS (inter frame spacing) time between the end of the TXOP of STA1 and the start of the TXOP for STA2 can be chosen smaller than the usual DIFS plus backoff to give priority to STA2. Another embodiment will be configured analogously if the primary communication channel only is busy.

The assumption in FIG. 2 is that the AP is able to operate over three channels, a primary communication channel, a secondary communication channel, and the access channel (USAC), which is advertised on the primary communication channel in beacon frames. Further, a legacy or new STA (STA1) has gained access to the medium and transmits to the AP using the primary and the secondary communication channel S1. The TXOP duration is known at the AP, e.g., from the Duration Field of an RTS, CTS, CTS to self, SP Request, which has been sent during the procedure to obtain and setup the TxOP.

To request access to the medium, a new STA nSTA2 first performs carrier sense on USAC. If the USAC is idle, nSTA2 uses this channel to request access by sending a request to access (RTA) frame, containing the intended duration of the transmission. Additionally the nSTA may indicate within the RTA which channels it prefers to use within the future TXOP, e.g., it may signal which of its operating channels were idle at the time of the RTA transmission. After SIFS, the AP sends nSTA2 an RTA Response (rRTA), indicating the network allocation vector (NAV) status on the requested channels (from the AP point of view) or existing SP schedules. Based on this information, nSTA 2 can infer the quickest possible time to access the requested channel. For example, in FIG. 2 the end of the currently granted TxOP is $t_{e,TxOP}$ and this is advertised in the rRTA.

After the time indicated in the rRTA elapses, and after preferably physical carrier sensing on the channels to be used indicates these are idle, nSTA2 obtains the TxOP to transmit to the AP. If LBT is indicating that the channel is busy, transmission will be deferred according to the common contention rules.

Additionally, the AP may configure the physical CCA nSTA2 shall apply after $t_{e,TxOP}$ has passed e.g., signal if nSTA2 needs to wait for an additional random backoff time, or some priority is given by reducing backoff time. By choosing a smaller IFS interval than the usual DIFS or allowing transmission without backoff, the AP may increase the chances for nSTA2 to obtain the TxOP just after the TxOP of STA1. Thus, the minimum time when the TXOP will start is a combination of the $t_{e,TxOP}$, the backoff time and the listening time. The timing information $t_{e,TxOP}$, as well as backoff intervals and interframe spacings for the desired communication should be with respect to the timing on the primary channel, corresponding to the desired communication.

In another embodiment, in the rRTA a time span may be indicated during which the nSTA2 shall listen for a trigger sent by the AP triggering the nSTA2 to transmit data.

Due to the random and difficult to schedule nature of the unlicensed spectrum, in an embodiment measures are provided to protect the RTA-rRTA message exchange as well as the TxOP establishment, especially in the absence of the primary communication channel, i.e., prevent collisions from other STAs attempting access.

To protect the RTA-rRTA message exchange, prior to the RTA transmission a CTS frame can be sent, indicating the duration of the RTA-rRTA exchange i.e., the duration of the RTA and rRTA frames and the two IFS intervals. Alternatively, the RTA frames may be sent with a very robust modulation (i.e., lower modulation and coding scheme) to allow other STAs to correctly demodulate them and decode the frame duration, thus avoiding access during the exchange. In this case, no CTS before transmission is required. The duration within the CTS and/or RTA frames may be set to the total duration of the requested TxOP. In the rRTA or in a frame sent after the rRTA, the duration on the USAC may be adjusted, e.g., to indicate termination of communication exchange on the USAC and continuation (according to requested TXOP duration) on the desired channels, in the case of granted communication on the desired channels.

To protect the future TxOP, an RTS (with CTS response by AP) or CTS may be transmitted before the start of the TxOP, within the intended channels for the future TXOP. The intended duration is signaled in the MAC header of the RTS or CTS frame. An rRTA may be transmitted before the start of the TxOP with robust modulation, in the intended channels for the future TXOP, to increase the chances of having the Duration field within the MAC header correctly decoded. The intended duration of the TXOP is included in the MAC header of the rRTA frame.

Figure 8:
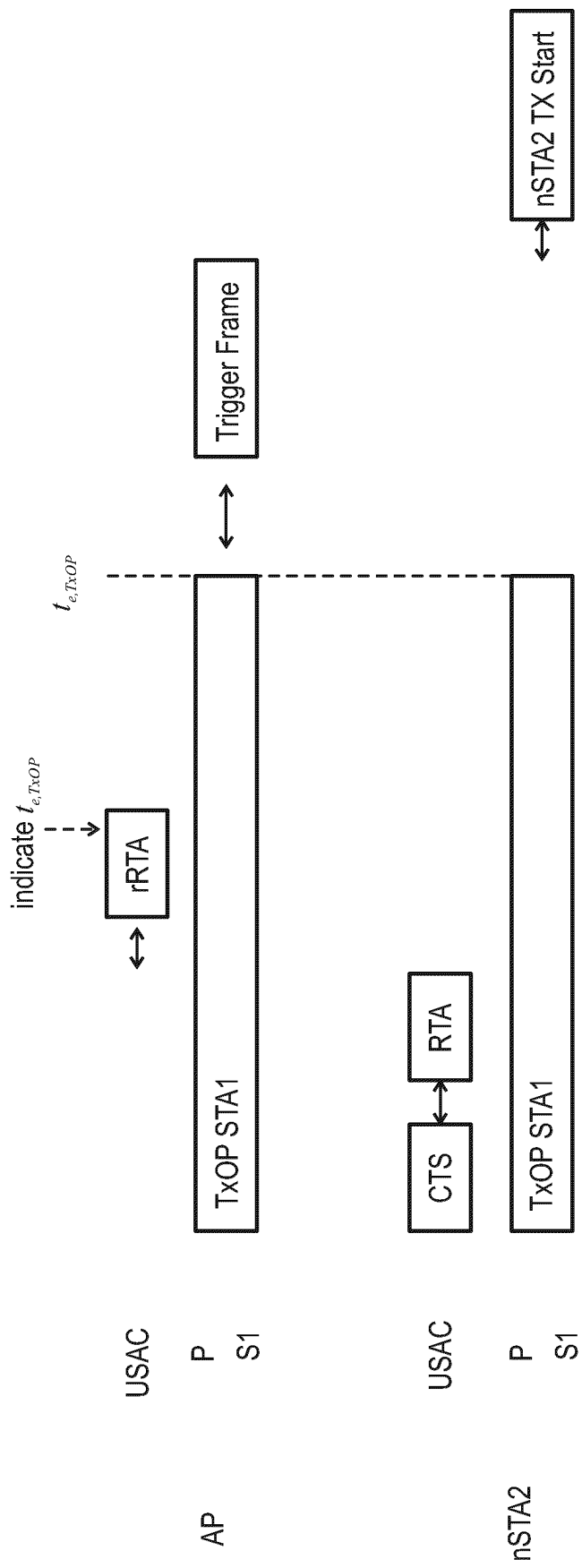
FIG. 8 shows a schematic diagram of a seventh embodiment of the communication according to the present disclosure.

Another option, illustrated in FIG. 8, is to have a trigger-based communication in the desired bands. More specifically, after $t_{e,TxOP}$ elapses and based on channel occupancy status, the AP sends a trigger to the nSTA in the desired channels. After the reception of this trigger and a predefined interframe spacing, the nSTA may start the transmission. In this case, the access response rRTA indicates trigger-based channel access for the desired channels in order to inform the requesting nSTA that it should wait for the trigger after the elapsed times and only afterwards start transmission.

Figure 3:
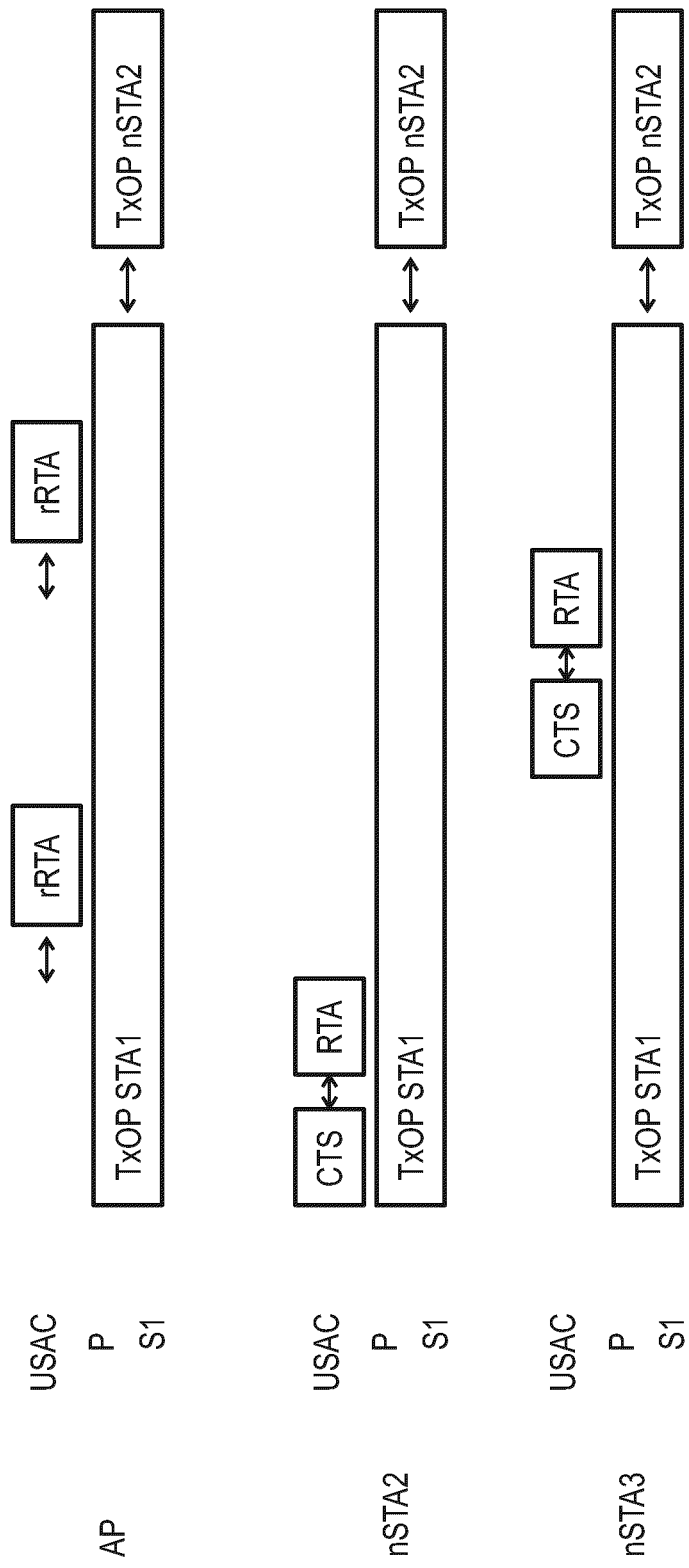
FIG. 3 shows a schematic diagram of a second embodiment of the communication according to the present disclosure.

Assuming that multiple nSTAs are requesting access to channels, as schematically illustrated in FIG. 3 showing another embodiment of the communication according to the present disclosure, and the primary and secondary communication channels are busy, the AP may prioritize the traffic streams. For example, according to the traffic priorities or some scheduling rules implemented by the AP, the AP may decide which nSTA may access first or at least ensure that the two STAs will not have the same backoff.

Figure 9:
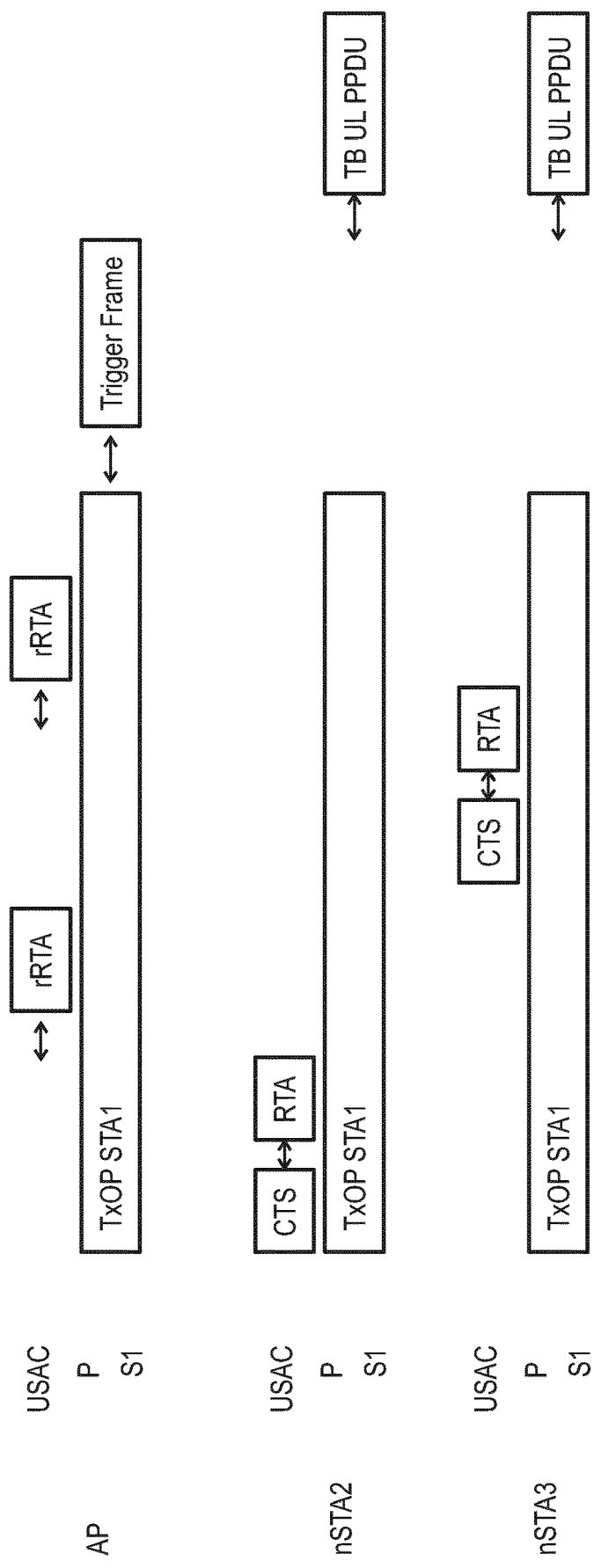
FIG. 9 shows a schematic diagram of an eighth embodiment of the communication according to the present disclosure.

Based on capabilities of the AP and STAs the different STAs requesting access may be served simultaneously on different frequency and/or space and/or time resources, referred to as resource units, after the $t_{e,TxOP}$ elapses. For this, a trigger frame is sent by the AP, after the $t_{e,TxOP}$ and IFS elapses, as illustrated in FIG. 9. The nSTAs, addressed by the trigger frame will then access the channel on the resource units specified within the trigger frame.

Another option for spectral sharing, made possible by trigger based transmission is to allow one of the STAs to use the primary and some secondary channels and the other to use only one or more of the remaining secondary channels (based on the request), while respecting that the transmission on secondary channels only does not exceed the transmission on the primary channel.

The rRTA can be immediate or delayed. The advantage of a delayed rRTA is given when multiple STAs are attempting channel access. In this case the AP is not sending an rRTA after each individual RTA request received, but instead will multiplex the responses for multiple STAs and send them simultaneously. In this case the response contains identifiers for all involved STAs, as well as a schedule containing, e.g., RUs that will be allocated for each STA in the desired channels. When the schedule is sent over the USAC, the trigger frame which will be sent in the primary channel and communication channels to trigger the desired communication from the STAs can be made much shorter, thus making better use of the primary channel.

The information of whether the STAs request immediate or delayed feedback can be included in the RTA requests. Alternatively, the AP may define and trigger intervals on the USAC when it is accepting RTA requests with delayed feedback and optionally the timestamp of the time when feedback will be sent. When RTAs are sent in the delayed feedback mode, the duration of these frames should not cover the IFS plus response duration.

Figure 4:
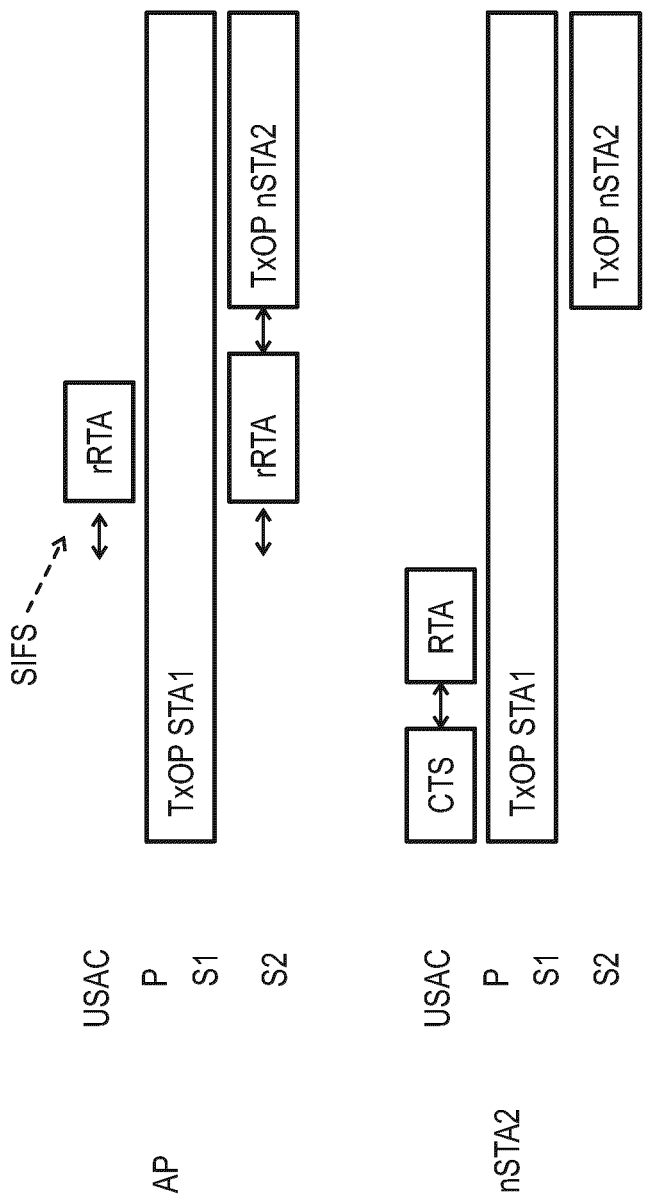
FIG. 4 shows a schematic diagram of a third embodiment of the communication according to the present disclosure.

Assuming the primary communication channel and the first secondary communication channel S1 are busy, but the USAC and some secondary communication channel is free, an nSTA may request and get access to the free secondary communication channel via the USAC. This embodiment of the communication according to the present disclosure is schematically illustrated in FIG. 4. The initial steps of nSTA2 requesting access over USAC are similar to those in FIG. 1. The RTA can contain information about the channels sensed idle at the time of the transmission e.g., STA2 senses the secondary S2 to be idle. If after carrier sense, this channel is also considered free by the AP, the rRTA indicates that a transmission on the secondary communication channel S2 may start.

Protecting the RTA-rRTA message exchange and future TxOP for multi-channel, in particular several options for protection of the TxOP on the secondary communication channel S2 after being set up, will be addressed in the following.

One option is for the AP to send a CTS (or trigger) on S2 together with the rRTA on USAC. If the timings on the two channels S2 and USAC are different, or a transmission on S2 is not possible at the same time as on the USAC, an interval in which the STA is expected to receive an CTS on the S2 can be defined. The CTS (or trigger) sent by the AP on S2 indicates the duration of the future TxOP.

Alternatively, the rRTA can be duplicated over S2 (in addition to USAC). However, the duration of the RTA-rRTA exchange on the USAC will be shorter than the duration of the communication on the desired channels, including the medium reservation. One option to reserve time for the desired communication on the desired channels and release the USAC after the transmission of the rRTA, is that the rRTA and the previous RTA frame contain within the duration field of the MAC Header an indication of the total TxOP duration whereas the rRTA further includes within the frame an indication of the actual time on the USAC. Another option is to send an additional frame within short IFS to stop the TxOP on the USAC. Still another option is to announce a dynamic scheduled interval for the duration of the TXOP of nSTA2.

Furthermore, in order to protect legacy devices from new STAs and new STAs from legacy devices it is beneficial to grant the TxOP for the nSTA2 such that its duration is not exceeding the duration of the TxOP on the primary communication channel. In this case, legacy STAs, which only update NAV information on the primary communication channel and only perform energy detect on secondary communication channels, would not attempt to access any of the channels over which the AP operates, even if they may not hear the transmission of nSTA2 on S2.

Figure 5:
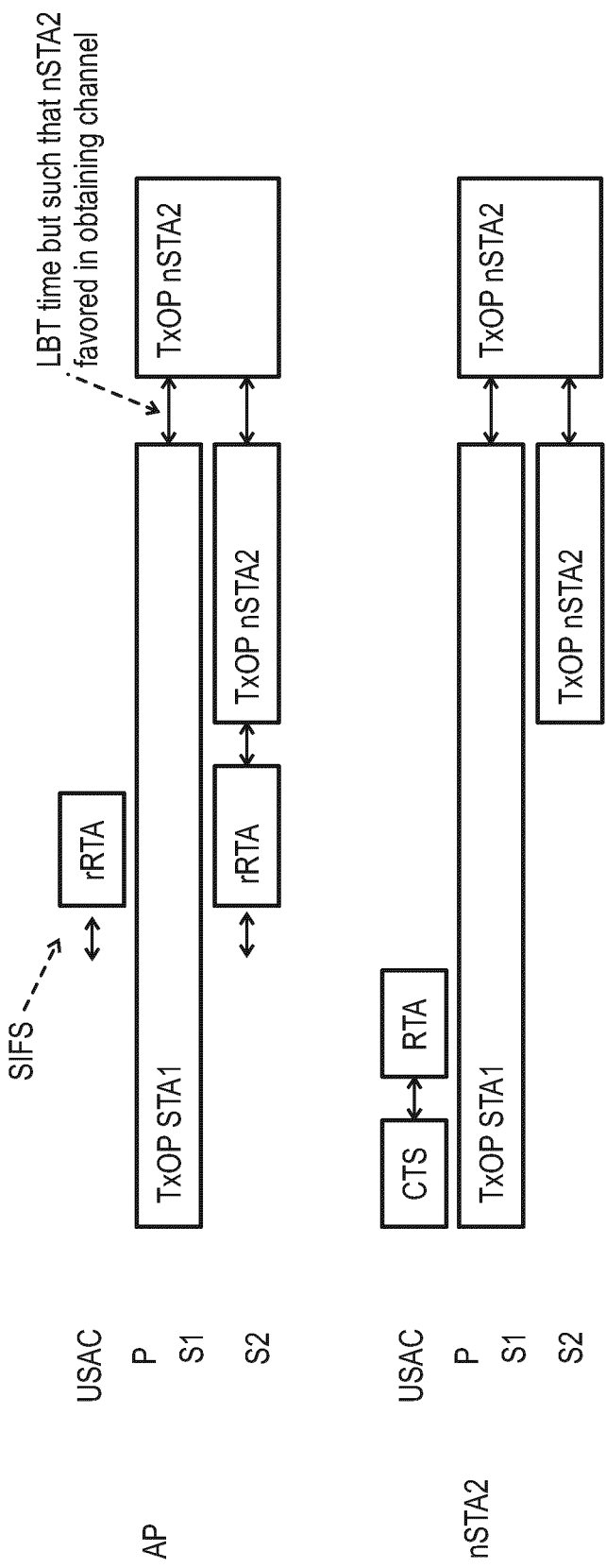
FIG. 5 shows a schematic diagram of a fourth embodiment of the communication according to the present disclosure.

After the end of the TXOP on the primary communication channel, STA2 may be given access to the other channels including the primary communication channel(s) to continue its transmission. This will be indicated within the rRTA, and the nSTA2 may be allowed to access the primary communication channel after a shorter interval than DIFS or without backoff, as shown in FIG. 5 schematically illustrating another embodiment of the communication according to the present disclosure.

If none of the secondary communication channels is free and the traffic priority is high, short channel access for timely short transmission may be granted on USAC until the next opportunity to transfer the communication in channels and/or bands other than the USAC.

Considering again the embodiment illustrated in FIG. 3, where multiple STAs attempt access over the USAC, however now in the context of having several secondary communication channels free, nSTA1 and nSTA2 may be given both access e.g. over different channels. The condition may still be that the maximum TxOP on the primary communication channel is not exceeded.

Figure 6:
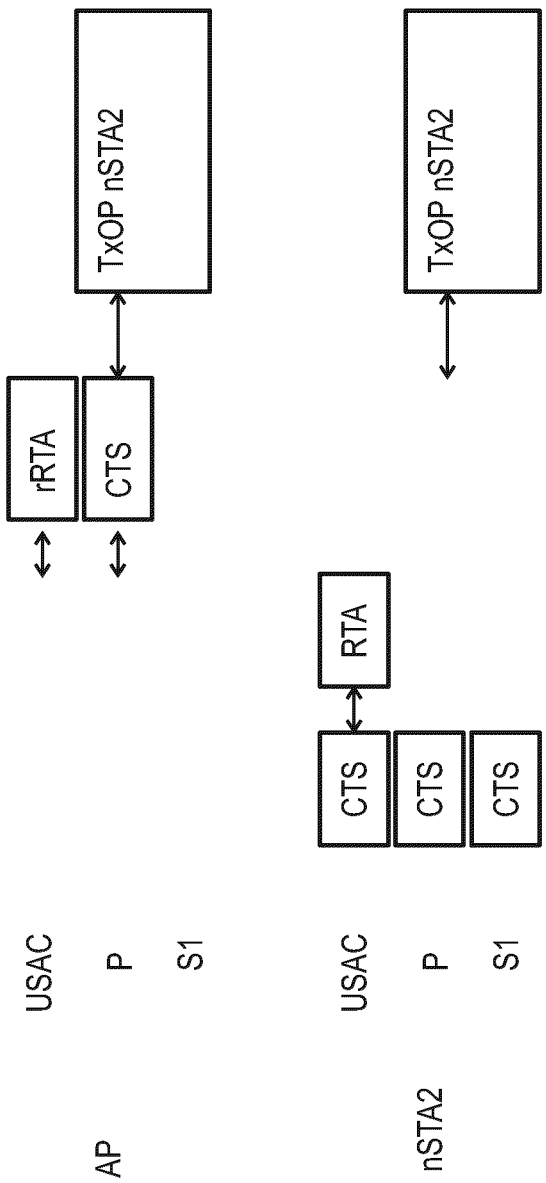
FIG. 6 shows a schematic diagram of a fifth embodiment of the communication according to the present disclosure.

When the primary communication channel is idle, the request for access as well as the response from the AP should be at least duplicated over this channel. If P and S1 are idle, the TxOP is granted over these channels, as shown in FIG. 6 illustrating another embodiment of the communication according to the present disclosure. The primary channel is left unoccupied to allow for other channel requests. To ensure a fair apportion of channel access opportunities for the legacy STAs as well as nSTAs, the AP may decide to free up the primary communication channel after the successful establishment of a TxOP in the S1 for the nSTA2. Alternatively, the AP can establish and maintain an SP in the S1 only, for the nSTA2, which is advertised in the rRTA frame or using one of the options mentioned in above with respect to FIG. 4), but in this case applied to the primary communication channel in addition to the USAC.

Figure 7:
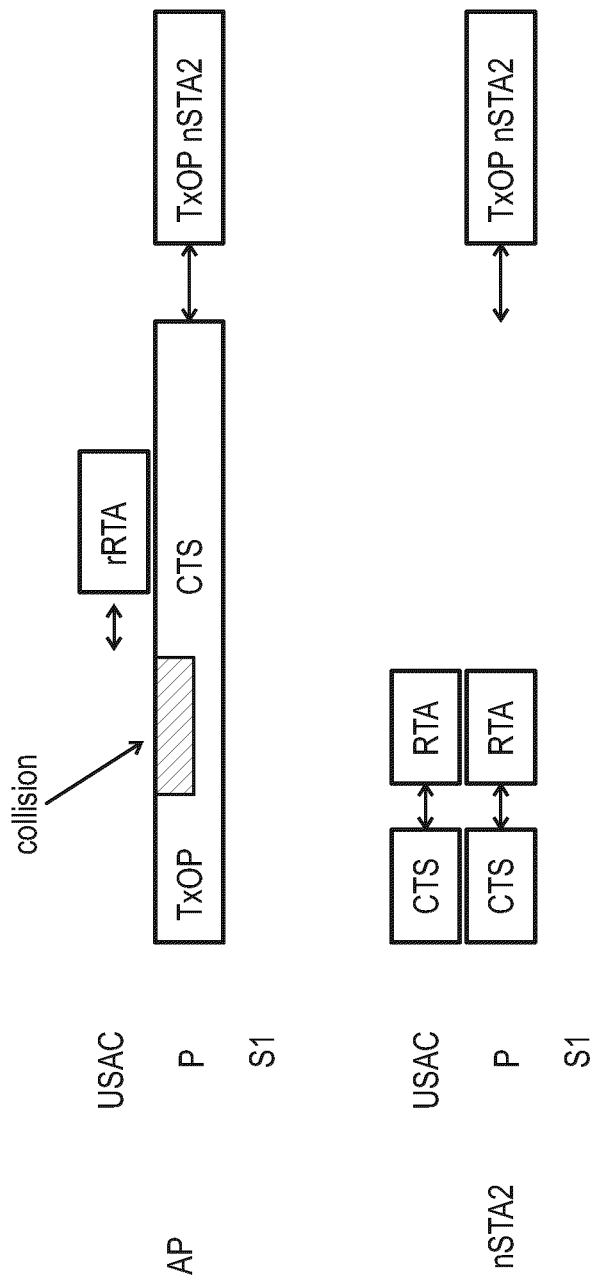
FIG. 7 shows a schematic diagram of a sixth embodiment of the communication according to the present disclosure.

When the primary communication channel is falsely sensed idle, as shown in FIG. 7 illustrating another embodiment of the communication according to the present disclosure, a collision will occur for the transmission time of the RTA or CTS and RTA. In this case, the AP sends the rRTA only over the USAC and this contains information of the NAV on all channels, thus informing nSTA2 of the occupancy of the primary communication channel. Thus, the collision will only be for the relatively short duration of the RTA frame or RTA and CTS frame. Such cases can only occur when legacy STAs start transmitting on the primary communication channel, however are hidden to the nSTA2, which attempts access. In order to avoid such cases, an unsolicited rRTA frame can be broadcasted on the USAC, just after a legacy STA starts transmitting on the primary communication channel and indicates the expected duration of this transmission.

In the following an example will be explained with TXOP splitting when STA requesting traffic has very high priority. An AP, operating besides the USAC, over P and S1, sends data traffic to nSTA1 on both latter channels. nSTA2 requires access to medium, thus sends RTA on USAC. nSTA 2 has higher traffic priority (more stringent latency requirements) than nSTA1 and AP decides to interrupt current data transfer to nSTA1 and serve nSTA2. The rRTA in this case carries notification of the stopping of nSTA1 transmission and granting the nSTA2 transmission. This scheme should use FDD operation at the nSTAs, i.e., nSTAs should be able to listen to the USAC while transmitting on the regular channels.

After SIFS, the AP sends an RTA Response on S2 to both STA1 and STA2. In this case the RTA Response indicates STA1 to stop at the first possibility to gain access to S1 for STA2 and STA 1. After time elapses and LBT and NAV check STA2 attempts access to the channel.

As an alternative to the schemes presented above, where the nSTA requests channel access, it is possible for the AP to advertise over the USAC regular listening intervals in the form of e.g., SP. nSTAs requesting access would then randomly choose an advertised slot according to their traffic priority and send RTA only in these intervals. This does not require simultaneous transmit and receive operation at the AP as the listening times can be properly scheduled, however this operation may be more inefficient than the multi-band counterpart.

When legacy STAs request channel access or start transmitting, (at least) the primary communication channel is used. As soon as the AP receives a channel access request in the form of a RTS, CTS, CTS to self, SP Request, etc., or a transmission from a legacy STA, it will send through the USAC an unsolicited rRTA containing the TxOP duration as appearing in the request or in the MAC frame duration. The advantage is protecting from hidden nodes.

In multi-band cases, in which multiple primary channels are used (one for each band), an USAC operation may be extended to allow channel access requests for all channels over which a STA operates. In this case for each band the rules described above regarding the TXOP durations on the primary channel and secondary channels should however be respected. For example, a TXOP, granted on secondary channels only, would not exceed the TXOP on the primary channel, defined for the corresponding frequency band.

The RTA frames may contain one or more of the following pieces of information:
  Channels on which the STA requesting access can operate;
  Channels which are considered idle (based on CCA level);
  TxOP duration or queue size for the requested traffic;
  Traffic priority;
  One or more values for the intended backoff after TxOP end. This may give an early indication of whether a collision is likely to occur. An AP in a BSS or master AP in a multi-AP environment may correct the backoff decision.

The rRTA frames may contain one or more of the following pieces of information:
  NAV status or scheduled SP status on the operating channels (i.e. network allocation status or scheduled service period status of primary and secondary communication channels available for communication);
  Information of next possible attempt for a TxOP (i.e. information of next possible attempt for a communication on the primary and secondary communication channels available for communication or on the desired communication channels);
  Whether the TxOP for the requesting STA will be a split TxOP and if yes which duration it will be for first channel, which duration, channel and channel access strategy should be used for the next part of the TxOP (i.e. information whether the communication for the requesting second communication device will be transmitted within one transmit opportunity over a desired set of communication channels or within more than one transmit opportunities including the primary communication channel, and which duration and/or communication channel and/or channel access strategy shall be used);
  STA prioritization: whether backoff is required or transmission directly after LBT can be done for a particular STA (i.e. prioritization information indicating whether backoff and/or which level of backoff is required for listen before talk procedure for a particular second communication device);
  Which STA should first attempt channel access after ongoing TxOP is ended (i.e. information which second communication device shall first attempt channel access after the current communication on the primary communication channel and/or desired secondary communication channel is ended);
  Which STA may access which channel (i.e. information which second communication device may access which communication channel and/or in which order);
  In a coordinated BSS or multi-AP environment backoff intervals among channels and BSSs may be shuffled and/or advertised to allow reduced collision probability while giving fair channel access (i.e. information if and which backoff intervals may be used).

In another embodiment the AP may transmit an (unsolicited) access response including collision information if there is (or will be) a collision on the primary communication channel. Said collision information indicates that there is a collision on the primary communication channel or that the primary communication channel is occupied or that a transmission on the primary channel has just started or is just about to start, in particular where the access request was performed only over the primary channel.

The present disclosure enables low latency data communications and ensures collision avoidance of data frames.

Figure 10:
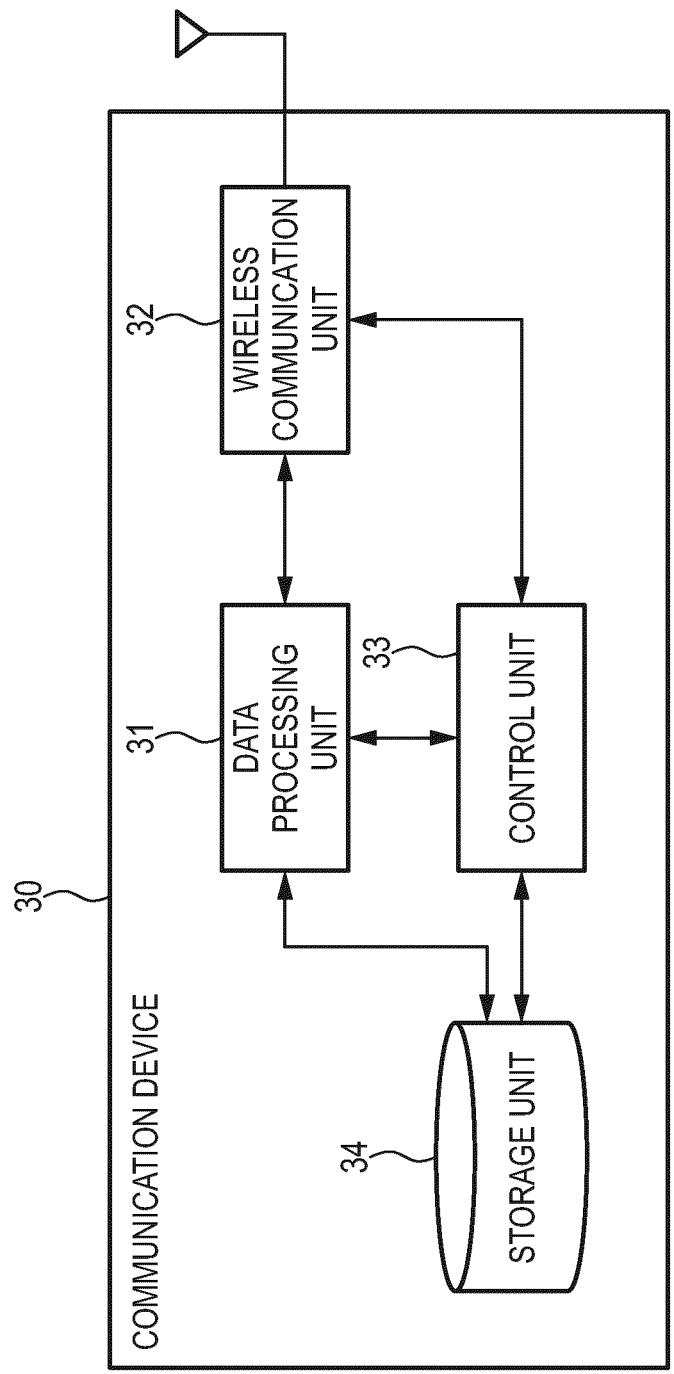
FIG. 10 shows a schematic diagram of the configuration of a first and second communication device according to an embodiment of the present disclosure.

FIG. 10 shows a schematic diagram of the configuration of a communication device 30 according to an embodiment of the present disclosure. Generally, each of the AP and the STAs may be configured as shown in FIG. 10 and may include a data processing unit 31, a wireless communication unit 32, a control unit 33, and a storage unit 34.

As a part of a communication device 30, the data processing unit 31 performs a process on data for transmission and reception. Specifically, the data processing unit 31 may generate a frame on the basis of data from a higher layer of the communication device 30, and may provide the generated frame to the wireless communication unit 32. For example, the data processing unit 31 generates a frame (in particular a MAC frame) from the data by performing processes such as fragmentation, segmentation, aggregation, addition of a MAC header for media access control (MAC), addition of an error detection code, or the like. In addition, the data processing unit 31 may extract data from the received frame, and provides the extracted data to the higher layer of the communication device 30. For example, the data processing unit 31 may acquire data by analyzing a MAC header and perform a reorder process, or the like with regard to the received frame.

The wireless communication unit 32 may have a signal processing function, a wireless interface function, and the like as part of a communication unit. Further, a beamforming function may be provided. This unit generates and sends PHY layer packets (or, in particular for a WLAN standard, PHY layer protocol data units (PPDU)), which have the physical representation of electric waveforms that can be radiated from one or multiple antennas and propagate in space.

The signal processing function is a function of performing signal processing such as modulation on frames. Specifically, the wireless communication unit 32 may perform encoding, interleaving, and/or modulation on the frame provided from the data processing unit 31 in accordance with a coding and modulation scheme set by the control unit 33, add a preamble and a PHY header, and generate a PHY layer packet. Further, the wireless communication unit 32 may recover a frame by performing demodulation, decoding, and the like on the PHY layer packet obtained by a process of the wireless interface function, and provide the obtained frame to the data processing unit 31 or the control unit 33.

The wireless interface function is a function to transmit/receive a signal via one or more antennas. Specifically, the wireless communication unit 32 may convert a signal related to the symbol stream obtained through the process performed by the signal processing function into an analog signal, amplify the signal, filter the signal, and up-convert the frequency (modulates the signal). Next, the wireless communication unit 32 may transmit the processed signal via the antenna. In addition, on the signal obtained via the antenna, the wireless communication unit 32 may perform a process that is opposite to the process at the time of signal transmission such as down-conversion of frequency (demodulation of the signal) or digital signal conversion.

The beamforming function may perform analog beamforming and/or digital beamforming, including beamforming training.

As a part of the communication unit, the control unit 33 (e.g., station management entity (SME)) may control the entire operation of the communication device 30. Specifically, the control unit 33 may perform a process such as exchange of information between functions, setting of communication parameters, or scheduling of frames (or packets) in the data processing unit 31.

The storage unit 34 may store information to be used for process to be performed by the data processing unit 31 or the control unit 33. Specifically, the storage unit 34 may store information stored in a transmission frame, information acquired from a receiving frame, information on a communication parameter, or the like.

In an alternative embodiment, the first and second communication devices, in particular each of the AP and the STAs, may be configured by use of circuitry that implements the units shown in FIG. 10 and the functions to be carried out. The circuitry may e.g. be realized by a programmed processor. Generally, the functionalities of first and second communication devices and the units of the communication device 30 shown in FIG. 10 may be implemented in software, hardware or a mix of software and hardware.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

The elements of the disclosed devices, apparatus and systems may be implemented by corresponding hardware and/or software elements, for instance appropriated circuits. A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors, which are programmed or configured according to software code. A circuit does not include pure software, although a circuit includes the above-described hardware executing software.

It follows a list of further embodiments of the disclosed subject matter:

1. A first communication device comprising circuitry configured to
    exchange control information with one or more second communication devices on a primary communication channel,
    exchange data with one or more second communication devices on one or more secondary communication channels and/or the primary communication channel,
    receive an access request to access the primary communication channel and/or one or more secondary communication channels by a second communication device on an access channel that is a different channel than the primary communication channel, the access request indicating one or more parameters of the desired communication, and
    transmit an access response on the access channel, the access response including time information indicating information regarding the time of desired communication and channel information indicating parameters of the communication channels of the desired communication.

2. The first communication device as defined in any one of the preceding embodiments,
    wherein the access request indicates duration, priority and/or operating communication channels of the desired communication.

3. The first communication device as defined in any one of the preceding embodiments,
    wherein the time information included in the access response indicates
        the time when the desired communication can occur, and/or
        a waiting time that the second communication device has to wait after the current communication in the desired communication channels has finished, before accessing the desired communication channel, and/or
        a time span during which the second communication device shall listen for a trigger sent by the first communication device triggering the second communication device to transmit data.

4. The first communication device as defined in any one of the preceding embodiments,
    wherein the channel information included in the access response indicates
        which communication channels can be accessed, and/or
        which channel access policy shall be used, and/or
        on which channels a trigger frame will be sent by the first communication device to trigger the transmission of the second communication device.

5. The first communication device as defined in any one of the preceding embodiments,
    wherein the circuitry is configured to transmit information indicating r the access channel on the primary communication channel.

6. The first communication device as defined in any one of the preceding embodiments,
    wherein the circuitry is configured to transmit scheduling information indicating the sequence and/or time intervals in which second communication devices may transmit access requests on the access channel.

7. The first communication device as defined in any one of the preceding embodiments,
    wherein the access request indicates one or more secondary communication channels sensed idle by a second communication device that transmitted the access request, wherein the circuitry is configured to sense, after receipt of the access request, if the one or more secondary communication channels indicated in the access request are idle and to include information on the one or more secondary communication channels sensed idle by the first communication device in the transmitted access response.

8. The first communication device as defined in embodiment 7,
    wherein the circuitry is configured to transmit a clear to send message and/or a copy of the access response on an idle secondary communication channel together with or after transmitting the access response on the access channel.

9. The first communication device as defined in embodiment 7 or 8,
    wherein the circuitry is configured to schedule the duration of data transmission of the second communication device on one or more idle secondary communication channels to end not later than when communication on the primary communication channel ends and/or to allocate, if the duration of the desired communication is longer than the currently ongoing communication on the primary channel, the remaining communication to communication over the primary communication channel and/or one or more secondary communication channels according to availability.

10. The first communication device as defined in embodiment 7, 8 or 9,
    wherein the circuitry is configured to transmit the access response and/or a clear to send message on the access channel and on the primary communication channel if the primary communication channel is sensed idle.

11. The first communication device as defined in any one of the preceding embodiments,
    wherein the circuitry is configured to transmit an access response including collision information if there is a collision on the primary communication channel, said collision information indicating that there is a collision on the primary communication channel or that the primary communication channel is occupied or that a transmission on the primary channel has just started or is just about to start, where the access request was performed only over the primary channel.

12. The first communication device as defined in any one of the preceding embodiments,
    wherein the circuitry is configured to transmit an access response including rescheduling information indicating that a second communication device that is currently using the primary communication channel and/or one or more secondary communication channels shall stop using the primary communication channel and/or one or more secondary communication channels and that another second communication device is allowed to use said primary communication channel and/or one or more secondary communication channels.

13. The first communication device as defined in any one of the preceding embodiments,
    wherein the access response includes one or more of network allocation status or scheduled service period status of primary and secondary communication channels available for communication;

information of next possible attempt for a communication on the primary and secondary communication channels available for communication or on the desired communication channels;

information whether the communication for the requesting second communication device will be transmitted within one transmit opportunity over a desired set of communication channels or within more than one transmit opportunities including the primary communication channel, and which duration and/or communication channel and/or channel access strategy shall be used;

prioritization information indicating whether backoff and/or which level of backoff is required for listen before talk procedure for a particular second communication device;

information which second communication device shall first attempt channel access after the current communication on the primary communication channel and/or desired secondary communication channel is ended;

information which second communication devices may access which communication channel and/or on which resource unit and/or in which order;

information if and which backoff intervals may be used.

14. The first communication device as defined in any one of the preceding embodiments,
wherein the circuitry is configured to select one of the secondary communication channels as access channel.

15. The first communication device as defined in any one of the preceding embodiments,
wherein the access request and/or access response contain within a header the duration of the communication on the access channel required to complete the exchange of the access request and access response.

16. The first communication device as defined in any one of the preceding embodiments,
wherein the circuitry is configured to grant data communication on the access channel with one or more second communication devices if conditions on duration and/or traffic priority and/or occupation of the primary and/or secondary communication channels are fulfilled.

17. The first communication device as defined in any one of the preceding embodiments,
wherein the circuitry is configured to restrict use of the access channel to specific traffic types.

18. The first communication device as defined in any one of the preceding embodiments,
wherein the circuitry is configured to decide upon the choice of the access channel based on information from other first communication devices and/or to communicate the choice of the access channel to other first communication devices.

19. A second communication device comprising circuitry configured to
exchange control information with a first communication device on a primary communication channel,
exchange data with the first communication device on one or more secondary communication channels and/or the primary communication channel,
transmit an access request to access the primary communication channel and/or one or more secondary communication channels by a second communication device on an access channel that is a different channel than the primary communication channel, the access request indicating one or more parameters of the desired communication,
receive an access response, the access response including time information indicating information regarding the time of desired communication and channel information indicating parameters of the communication channels of the desired communication, and 20. The second communication device as defined in embodiment 19,
wherein the circuitry is configured to transmit a clear to send message on the access channel before transmitting an access request, the clear to send message containing the duration of the access request, response and interframe distances.

21. The second communication device as defined in any one of embodiments 19 to 20,
wherein the circuitry is configured to transmit the access request and/or a clear to send message on the access channel and on the primary communication channel if the primary communication channel is sensed idle.

22. The second communication device as defined in any one of embodiments 19 to 21,
wherein the access request includes one or more of
communication channels on which the second communication device can operate;
communication channels that are considered idle;
communication duration or queue size for the requested communication;
communication priority;
one or more values for the intended backoff.

23. A first communication method comprising
exchanging control information with one or more second communication devices on a primary communication channel,
exchanging data with one or more second communication devices on one or more secondary communication channels and/or the primary communication channel,
receiving an access request to access the primary communication channel and/or one or more secondary communication channels by a second communication device on an access channel that is a different channel than the primary communication channel, the access request indicating one or more parameters of the desired communication, and
transmitting an access response on the access channel, the access response including time information indicating information regarding the time of desired communication and channel information indicating parameters of the communication channels of the desired communication.

24. A second communication method comprising
exchanging control information with a first communication device on a primary communication channel,
exchanging data with the first communication device on one or more secondary communication channels and/or the primary communication channel,
transmitting an access request to access the primary communication channel and/or one or more secondary communication channels by a second communication device on an access channel that is a different channel than the primary communication channel, the access request indicating one or more parameters of the desired communication,
receiving an access response, the access response including time information indicating information regarding the time of desired communication and channel information indicating parameters of the communication channels of the desired communication, and scheduling the communication with the first communication device according to the received access response.

25. A non-transitory computer-readable recording medium that stores therein a computer program product, which, when executed by a processor, causes the method according to embodiment 23 or 24 to be performed.

26. A computer program comprising program code means for causing a computer to perform the steps of said method according to embodiment 23 or 24 when said computer pro-gram is carried out on a computer.

The invention claimed is:

1. A first communication device comprising:
circuitry configured to:
exchange control information with one or more second communication device on a primary communication channel,
exchange data with the one or more second communication device on at least one of one or more secondary communication channels or the primary communication channel,
receive an access request to access at least one of the primary communication channel or the one or more secondary communication channels by a second communication device on an access channel that is a different channel than the primary communication channel and is a different channel than the one or more secondary communication channels, the access request indicating one or more parameters of a desired communication, and
transmit an access response on the access channel, the access response including time information indicating information regarding a time or the desired communication and channel information indicating parameters of communication channels for the desired communication.

2. The first communication device as claimed in claim 1, wherein the time information included in the access response indicates one or more of:
a time when the desired communication can occur,
a waiting time that the second communication device has to wait after a current communication in a desired communication channel has finished, before accessing the desired communication channel, and
a time span during which the second communication device shall listen for a trigger sent by the first communication device triggering the second communication device to transmit data.

3. The first communication device as claimed in claim 1, wherein the channel information included in the access response indicates one or more of:
which communication channels can be accessed,
which channel access policy shall be used, and
on which channels a trigger frame will be sent by the first communication device to trigger a transmission of the second communication device.

4. The first communication device as claimed in claim 1, wherein the circuitry is configured to transmit one or more of:
information indicating the access channel on the primary communication channel, and scheduling information indicating at least one of a sequence or time intervals in which second communication devices may transmit access requests on the access channel.

5. The first communication device as claimed in claim 1, wherein the access request indicates one or more of:
duration of the desired communication,
priority of the desired communication,
operating communication channels of the desired communication, and
one or more secondary communication channels sensed idle by the second communication device that transmitted the access request, and
wherein the circuitry is configured to:
sense, after receipt of the access request, if the one or more secondary communication channels indicated in the access request are idle, and
include information on the one or more secondary communication channels sensed idle by the first communication device in the transmitted access response.

6. The first communication device as claimed in claim 5, wherein the circuitry is configured to transmit at least one of a clear to send message or a copy of the access response on an idle secondary communication channel together with or after transmitting the access response on the access channel.

7. The first communication device as claimed in claim 5, wherein the circuitry is configured to at least one of:
schedule a duration of data transmission of the second communication device on one or more idle secondary communication channels to end not later than when communication on the primary communication channel ends, or
allocate, if the duration of the desired communication is longer than a currently ongoing communication on the primary communication channel, the remaining communication to communication over at least one of the primary communication channel or one or more secondary communication channels according to availability.

8. The first communication device as claimed in claim 1, wherein the circuitry is configured to transmit an unsolicited access response including collision information if there is a collision on the primary communication channel, said collision information indicating one of:
that there is a collision on the primary communication channel,
that the primary communication channel is occupied, or
that a transmission on the primary communication channel has just started or is just about to start.

9. The first communication device as claimed in claim 1, wherein the access response includes one or more of:
a network allocation status or a scheduled service period status of primary and secondary communication channels available for communication;
information of a next possible attempt for a communication on the primary and secondary communication channels available for communication or on the desired communication channels;
information as to whether the desired communication for the second communication device will be transmitted within one transmit opportunity over a desired set of communication channels or within more than one transmit opportunities including the primary communication channel and as to one or more of a duration, a communication channel, and a channel access strategy that shall be used;

prioritization information indicating whether one or more of backoff and which level of backoff is required for a listen before talk procedure for a particular second communication device;

information as to which second communication device shall first attempt channel access after a current communication on one or more of the primary communication channel and a desired secondary communication channel is ended;

information as to which second communication devices may access which communication channel including one or more of on which resource unit and in which order; and information as to if and which backoff intervals may be used.

10. The first communication device as claimed in claim 1, wherein at least one of the access request or the access response contains, within a header, a duration of a communication on the access channel required to complete the exchange of the access request and the access response.

11. The first communication device as claimed in claim 1, wherein the circuitry is configured to grant data communication on the access channel with one or more second communication device if conditions on one or more of duration, traffic priority, occupation of the primary, and secondary communication channels are fulfilled.

12. The first communication device as claimed in claim 1, wherein the circuitry is configured to restrict use of the access channel to specific traffic types.

13. The first communication device as claimed in claim 1, wherein the circuitry is configured to at least one of:
decide upon a choice of the access channel based on information from other first communication devices, or
communicate the choice of the access channel to other first communication devices.

14. The first communication device as claimed in claim 1, wherein the circuitry receives the access request when the second communication device determines that the primary communication channel is not idle.

15. A second communication device comprising:
circuitry configured to:
exchange control information with a first communication device on a primary communication channel,
exchange data with the first communication device on at least one of one or more secondary communication channels or the primary communication channel,
determine whether or not the primary communication channel is idle,
when the primary communication channel is determined to be not idle, transmit an access request to access at least one of the primary communication channel or the one or more secondary communication channels on an access channel that is a different channel than the primary communication channel, the access request indicating one or more parameters of a desired communication,
receive an access response, the access response including time information indicating information regarding a time for the desired communication and channel information indicating parameters of communication channels for the desired communication, and
schedule the desired communication with the first communication device according to the received access response.

16. The second communication device as claimed in claim 15, wherein the circuitry is configured to transmit a clear to send message on the access channel before transmitting the access request, the clear to send message containing a duration of the access request, the access response, and interframe distances.

17. The second communication device as claimed in claim 15, wherein the access request includes one or more of:
communication channels on which the second communication device can operate;
communication channels that are considered idle;
a communication duration or a queue size for the desired communication;
a communication priority; and
one or more values for an intended backoff.

18. A first communication method comprising:
exchanging control information with one or more second communication device on a primary communication channel,
exchanging data with the one or more second communication device on at least one of one or more secondary communication channels or the primary communication channel,
receiving an access request to access at least one of the primary communication channel or the one or more secondary communication channels by a second communication device on an access channel that is a different channel than the primary communication channel and is a different channel than the one or more secondary communication channels, the access request indicating one or more parameters of a desired communication, and
transmitting an access response on the access channel, the access response including time information indicating information regarding a time for the desired communication and channel information indicating parameters of communication channels for the desired communication.

19. A second communication method comprising:
exchanging control information with a first communication device on a primary communication channel,
exchanging data with the first communication device on at least one of one or more secondary communication channels or the primary communication channel,
determining whether or not the primary communication channel is idle,
when the primary communication channel is determined to be not idle, transmitting an access request to access at least one of the primary communication channel or the one or more secondary communication channels on an access channel that is a different channel than the primary communication channel, the access request indicating one or more parameters of a desired communication,
receiving an access response, the access response including time information indicating information regarding a time for the desired communication and channel information indicating parameters of communication channels for the desired communication, and
scheduling the desired communication with the first communication device according to the received access response.

20. A non-transitory computer-readable recording medium that stores therein a computer program, which, when executed by a processor, causes the method according to claim 18 or 19 to be performed.

\* \* \* \* \*